(12) United States Patent
Rivers, Jr. et al.

(10) Patent No.: US 7,182,408 B2
(45) Date of Patent: Feb. 27, 2007

(54) FREE SPINNING RIM FOR MOTORCYCLES

(76) Inventors: Michael Rivers, Jr., 1148 Pulaski Hwy. Suite 107-344, Bear, DE (US) 19701; Marc C. Mathis, 118 Creekmont Ct., Newark, DE (US) 19702

( * ) Notice: Subject to any disclaimer, the term of this patent is extended or adjusted under 35 U.S.C. 154(b) by 0 days.

(21) Appl. No.: 10/661,281

(22) Filed: Sep. 12, 2003

(65) Prior Publication Data

US 2005/0173968 A1     Aug. 11, 2005

Related U.S. Application Data

(60) Provisional application No. 60/410,103, filed on Sep. 12, 2002.

(51) Int. Cl.
*B60B 7/20*     (2006.01)
(52) U.S. Cl. .................. 301/37.25; 301/37.41
(58) Field of Classification Search ............ 301/37.25, 301/37.29, 37.102, 37.108, 105.1, 37.26, 301/37.106, 37.105, 108.1, 108.5, 110.5, 301/111.01, 37.37, 37.41; 40/587, 590; 280/160.1, 280/288.6; 244/103 S
See application file for complete search history.

(56) References Cited

U.S. PATENT DOCUMENTS

| | | | | |
|---|---|---|---|---|
| 710,195 | A | * | 9/1902 | Jones ........................... 40/587 |
| 1,500,884 | A | * | 7/1924 | Murnin ......................... 40/587 |
| 2,762,469 | A | * | 9/1956 | Lyon ....................... 188/264 W |
| 3,219,391 | A | * | 11/1965 | Hettinger .................. 301/37.25 |
| 3,233,849 | A | * | 2/1966 | Rubin ..................... 244/103 S |
| 3,336,084 | A | * | 8/1967 | Fenton ..................... 301/108.1 |
| 3,722,958 | A | * | 3/1973 | Marshall .................. 301/37.25 |
| 4,040,582 | A | * | 8/1977 | Krauss .................... 244/103 S |
| 5,016,944 | A | * | 5/1991 | Schultz .................... 301/37.25 |
| 5,259,431 | A | * | 11/1993 | Housiaux ..................... 152/523 |
| 6,032,900 | A | * | 3/2000 | Smith ..................... 244/103 S |
| 6,517,167 | B2 | * | 2/2003 | Baker ...................... 301/37.25 |
| 6,637,830 | B1 | * | 10/2003 | Burgess ................... 301/37.25 |
| 6,964,454 | B1 | * | 11/2005 | Miansian et al. ........ 301/37.25 |
| 6,981,749 | B2 | * | 1/2006 | Cavazos et al. ......... 301/37.25 |
| 2004/0000812 | A1 | * | 1/2004 | Fitzgerald ................ 301/37.25 |

* cited by examiner

*Primary Examiner*—Russell D. Stormer
(74) *Attorney, Agent, or Firm*—Connolly Bove Lodge & Hutz LLP

(57) ABSTRACT

A free spinning rim assembly is provided which is mountable to a first and second face of a motorcycle wheel including an axle shaft through its axis of rotation. The spinning rim assembly includes a spinner, which rotates about and is positioned circumspect the axle shaft, in proximity to the wheel face. The spinner rotates around the axle shaft at a different angular speed relative to the wheel on which it is mounted. The spinning rim assembly includes a spinning rim having a central bore, which is supported by a friction reducing means positioned in the spinner central bore. The friction reducing means is supported by a retaining means, which is further supported by the wheel hub.

19 Claims, 9 Drawing Sheets

FREE SPINNING RIM FOR MOTORCYCLES

RELATED APPLICATIONS

The present application relates to and claims priority to U.S. Provisional Application No. 60/416,103 entitled "Free Spinning Rim for Motorcycles," filed Sep. 12, 2002, herein incorporated by reference in its entirety.

FIELD OF INVENTION

This invention relates generally to a wheel rim for motorcycles, and more particularly to a free spinning rim for use with wheels attached to a vehicle frame on both sides of the wheel face.

BACKGROUND OF THE INVENTION

In recent years, motorcycle manufactures have attempted to find ways to distinguish their products from their competitors. In doing so, the manufactures have focused on differing ornamental features and engine designs. The result is that the motorcycles on the market typically include different colors, shapes, and sizes of the motorcycle frame.

In some instances, to distinguish their product, motorcycle manufactures have developed different ornamental designs directed toward the appearance of the motorcycle wheel (e.g. "motorcycle rim"). For example, FIG. 1 is a depiction of a motorcycle wheel face disclosed in U.S. Pat. No. D445,081 S issued Jul. 17, 2001 to Cunningham. The patent discloses an ornamental design for the front face of a motorcycle rim 100 including five tapered spokes 102 attached to a generally circular hub 104. The spokes 102 are additionally attached to the inner perimeter 108 of the rim 100. In operation, a motorcycle tire (not shown) may be placed on the outer perimeter 106 of the rim, and the rim 100 may be affixed to the front or rear of motorcycle frame (not shown) on both front faces of the wheel. When the motorcycle is in motion, the rim 100 including the spokes 102 rotates and ceases rotation when the motorcycle comes to a standstill.

FIG. 2 illustrates another design for the front face of a motorcycle rim 200 which is disclosed in U.S. Pat. No. D463,013 entitled "Motorcycle Wheel Front Face" issued Jan. 22, 2002 to Cunningham, wherein the spokes 202 are of an irregular shape. The spokes 202 are affixed to the inner perimeter 208 of the motorcycle rim 200 and to a circular hub 204. A motorcycle tire (not shown) may be affixed to the outer perimeter 206 of the rim. Similar to rim 100, the rim 200 may be affixed to the front or rear of motorcycle frame (not shown). When the motorcycle is in motion, the rim 200 including spokes 202 rotates and ceases rotation when the motorcycle comes to a standstill.

As can be seen, the exemplary motorcycle rims of FIGS. 1 and 2 are directed toward the aesthetic appearance of the motorcycle wheel rim. The designs of FIGS. 1 and 2 are typical of the present efforts to enhance the ornamental appearance of a motorcycle wheel by varying the size and shapes of the wheel spokes.

In addition to manipulating the ornamental design of the wheel spokes, some manufacturers seek to distinguish their wheels by placing, for example, decorative nuts, sometimes referred to as "spinner nuts," mechanically coupled to a corresponding vehicle wheel. One such spinner nut is disclosed in U.S. Pat. No. 4,191,427, entitled "Simulated Knock Off Spinner Nut," issued Mar. 4, 1980, to Bradley. The Bradley patent teaches a simulated knock off wheel spinner nut which may be attached to a wheel without having to remove the wheel of the vehicle. Since spinner nuts are typically in direct mechanical coupling to the corresponding wheel, the spinner nut rotates at the same rotation speed as the wheel. Thus, as the vehicle moves, the wheel and the spinner nut move simultaneously at an identical angular speed and may be perceived by observers outside the vehicle as a rather pleasant blur.

Other known wheel assemblies have used bearing means to fully decouple wheel rotation from a stationary wheel cover. Decoupling of the wheel cover may be desirable when the cover carries advertisement displays, or other information that, in order to be legible to an observer, needs to be stationary when the vehicle is in motion. Since the cover is decoupled from the wheel, the cover remains stationary when the wheel is in motion, permitting the information on the wheel cover to be appropriately perceived.

The aforementioned known wheel assemblies are designed either to rotate at full wheel speed when the wheels are in motion, or conversely, to fully suppress rotation as the wheel rotates. Few techniques, however, exist that take advantage of the aesthetically pleasant visual effects that may occur if the wheel includes elements that rotate at a different speed relative to the wheel speed. Although not directed toward motorcycles, one such technique is disclosed in U.S. Pat. No. 6,554,370, entitled "Wheel Spinner Assembly Independently Rotatable Relative to a Corresponding Wheel," issued Apr. 29, 2003, to Fowlkes. The Fowlkes patent generally discloses a system for enhancing the aesthetic appeal of an automobile wheel wherein a wheel spinner assembly rotates at a different speed relative to the wheel. Particularly, the Fowlkes patent discloses a wheel spinner assembly mountable onto a corresponding wheel or vehicle. As shown in FIG. 3, the assembly 10 includes a spinner 30 rotatably affixed to a wheel mount 14 which is coupled to a vehicle wheel (not shown), using a plurality of bolts positioned through bolt passageway 16. A spinner mount 18 is disposed through the axis of rotation of the spinner 30, and through the center of the wheel mount 14, for affixing the spinner 30 to the wheel mount 18. In the preferred embodiment, the spinner mount 18 may resemble a screw or bolt configured to receive a corresponding nut 22 and washer 24.

The Fowlkes spinner assembly 10 includes a ball bearing assembly 28 having a plurality of balls 32 confined between outer and inner rings 34 and 36 respectively. A bearing collar 37 may be provided to give radial support to the inner ring bearing assembly. The spinner mount 18 further includes a section 26 configured to receive a bearing or bushing assembly 28 that permits independent rotation between the spinner mount 18 and the spinner 30 including radially extending spokes 38, thereby allowing the spinner 30 and spokes 38 to rotate at a different speed relative to the wheel speed.

The spinner assembly described in Fowlkes is designed to be directly affixed to a respective wheel of a vehicle by suitable fastening means, such as a plurality of bolts extending through a plurality of corresponding bolt passageways 16 in wheel mount 14. The spinner mount 18 is affixed to the center of wheel mount 14, and the spinner 30 is affixed to the center of the spinner mount 18. The spinner mount 18 is designed to support the spinner 30 in free rotation relative to the wheel 12. The spinner mount 18 is disposed through spinner 30 central axis of rotation. Thus the spinner mount 18 extends at least partially through the center of spinner assembly 10. Consequently, the Fowlkes invention is not suitable for use on vehicles on which the wheels include a central axle shaft or hub traversing therethrough, for attachment to a vehicle frame at opposing ends of the axle.

Particularly, conventional bicycles and motorcycles include, for example, typically include an axle shaft which extends through the center of the wheel face for attachment to a front or rear fork of the vehicle frame. These vehicles typically include a front wheel, which is used for steering the vehicle and a rear wheel for providing the vehicle with forward motion. Typically, steering handles or handlebars are interconnected to the front wheel, and more particularly, to the front wheel axle shaft, via a front fork including two adjacent parallel tangs or legs which mechanically couple to and extend upward from each side of the wheel axle shaft. The tangs connect at the top of the wheel to a central steering tube attached to the handlebars. The central steering tube is rotatably mounted to the frame of the bicycle in a manner that supports the frame on the wheel's axle while permitting rotation of the central steering tube and thus allowing the front wheel to turn relative to the frame of the vehicle.

As noted, bicycles and motorcycles also typically include a rear wheel for use in providing the vehicle with a forward motion. The rear wheel is generally affixed to the vehicle frame in between a rear fork in similar manner as is discussed with respect to the vehicle front wheel. That is the rear wheel typically includes an axle shaft traversing therethrough for use in rotatably connecting the rear wheel to vehicle frame. The rear wheel may further include other components attached thereto, such as dust seal or, drive sprockets. The rear wheel, and corresponding components, may be affixed to the vehicle by fastening the rear wheel and the components to a rear fork with the tangs of the rear fork attachable to opposite sides of the rear wheel.

As can be seen, since Fowlkes discloses a system including a spinner mount positioned centrally to the spinner assembly, the spinner mount would necessarily interfere with the axle shaft required for attaching a motorcycle or bicycle wheel to the vehicle frame. In addition, the spinner mount and spinner assembly of Fowlkes, when take in combination as intended, or individually, is too bulky around the wheel axis of rotation for use with a motorcycle or bicycle wheel, since little room exists for attaching the Fowlkes spinner and spinning mount between the wheel and vehicle frame. More particularly, since the Fowlkes spinner mount is central to the wheel, the spinner mount makes it impossible to traverse a shaft through the spinning mount for attachment to the motorcycle or bicycle frame as required by most motorcycle or bicycle wheels. Consequently, the Fowlkes system is unsuitable for use with a motorcycle or bicycle wheel, or the like requiring attachment to the frame of both sides of the wheel via an axle shaft. Thus, it is desirable to provide a wheel spinner assembly which compensates for the centrally positioned axle shaft of a vehicle wheel, and which rotates at a different rotational speed than the speed of the corresponding wheel. The desired wheel spinner must be of sufficient size to fit within the relatively narrow space between a motorcycle or bicycle wheel and the vehicle frame. Such an assembly would enhance the aesthetic appeal of the wheel whether or not the wheel is in motion.

Additionally, the construction of the Fowlkes spinner assembly, which, as noted, interferes with the placement of a motorcycle or bicycle wheel axle shaft, is only suitable for use with vehicle wheels with only one face viewable to an outside observer during use. More particularly, vehicle wheels which may be viewed by an outside observer on either side during use generally include an axle shaft for attaching the wheel to the vehicle frame on both sides of the wheel. In this way, the rotation of a single wheel may be viewed by an outside observer positioned on either side of the vehicle. Further, the wheel angular rotation is supported the axle shaft disposed through the wheel central axis of rotation. Thus, as noted, the Fowlkes support frame interferes with the position of the axle shaft. As such, the Fowlkes invention is also not suitable for use with a vehicle wheel wherein the rotation of the wheel is fully observable by an outside observer from either side.

SUMMARY OF THE INVENTION

A motorcycle wheel system is provided which enhances the aesthetic appeal of a motorcycle wheel when the motorcycle is stationary or in motion. The present invention is suitable for use with wheels including an axle shaft positioned through the wheel central axis of rotation for supporting the wheel's rotation. A suitable wheel for use with the invention is attachable to a vehicle frame on both sides of the wheel (via the axle shaft) permitting viewing of the wheel rotation by an outside observer positioned on either side of the wheel. The present invention enhances the aesthetic appeal of the wheel by providing a spinning rim attachable to either face of the wheel, which is rotatable at a different angular speed relative to the wheel.

In this way, the present invention provides a free rotating rim ("spinner" or "spinning rim"), which may simulate wheel rotation when the motorcycle is at a standstill, or may simulate a different angular speed of the wheel than is ordinarily required to move the vehicle at the perceived vehicle speed.

The spinner is placed in rotational propinquity to the vehicle wheel. When the motorcycle is in motion, the spinner may rotate at a different rotational speed than the speed of the motorcycle wheel and may continue to rotate relative to the motorcycle wheel when the wheel comes to a stop. The different rotational speed of the spinner relative to the wheel provides aesthetically pleasing advantages over the prior art. For example, if the rotational speed of the spinner is less relative to the rotational speed of the motorcycle wheel, then the vehicle may appear to an outside observer to be hovering. Further, should the spinner rotate at the same rotational speed or a greater rotational speed than the motorcycle wheel, then the motorcycle may appear to be stationary or moving at a fast or faster rate than the actual vehicle speed. Further still, other visually pleasant effects may be achieved where the spinner continues to spin for an extended period of time after the vehicle ceases motion.

Even further, where the spinner includes means for trapping passing air as the motorcycle is in motion, the spring may rotate in the angular direction opposite (counter clockwise vs. clockwise) the motorcycle wheel, and the wheel may appear to be moving in reverse direction to the movement of the motorcycle.

In accordance with an exemplary embodiment of the invention, a spinner assembly may include spokes radiating from a spinner central opening. Alternatively, the spinner assembly may include a spinning portion substantially shaped like a disc. As such, the shape of the spinner portion may take various shapes and configurations. To aid in understanding the invention, the spinner portion may be described herein as a "spinning rim." The spinner spokes and, indeed the spinning rim, may be of an indeterminate size and shape and the present invention is not thereby limited. As described more fully below, spinning rim (e.g. "spinner") may freely rotate independently of the motorcycle wheel, thereby simulating wheel rotation irrespective of the actual rotational speed of the motorcycle wheel.

Such rotation may be accomplished by forming the spinner such that the weight (or mass) of the spinner disposed near the spinner's outer perimeter, is greater than the weight (or mass) of the spinner near the spinner central axis of rotation, to facilitate angular rotation of the spinner. Alternatively, the spinner may include means for including weight (or mass) near the spinner outer perimeter, as noted above and described more fully below.

It should be noted that, although the present invention is described with respect to a motorcycle wheel or motorcycle rim, the invention is not so limited. Instead, the present invention is contemplated for any vehicle wheel including a central axle or axle shaft therethrough for attaching the wheel to a vehicle frame on both sides of the wheel. For example, the present invention may be useful for unicycle wheels, bicycle wheels, tricycle wheels, motorcycle wheels, all terrain vehicle (ATV) wheels, and the like. In addition, conventional vehicle frame structure and operation, and the mechanical coupling of the wheel to the frame via an axle shaft are well understood in the art, and as such, will not be discussed herein for brevity.

In an exemplary embodiment of the present invention, the spinning rim may be positioned to rotate freely alongside at least once face of a motorcycle rim or motorcycle wheel without using a spinner mount as found in the prior art and more specifically, as is found in the Fowlkes patent noted above. The terms "motorcycle wheel" and "motorcycle rim" are used interchangeably and the terms may include the addition of an appropriate tire, although not specifically mentioned. The motorcycle rim may be configured with a motorcycle rim hub (e.g., "wheel hub") which may be positioned central to the wheel face coaxially with the wheel's axis of rotation. Further, as used herein, wheel "face" may include a portion of the wheel which is substantially perpendicular to the axis of rotation for the wheel. More particularly, the wheel "face" may mean that portion of the wheel to which the wheel hub may be attached, as described more fully below. The hub may include an opening for traversing a hub axle (e.g., axle shaft or central axle shaft) therethrough which may be immovably affixed to a motorcycle frame on opposite ends of the axle when the wheel is attached to the wheel frame.

The motorcycle wheel may additionally be configured to coaxially move rotatably to the aforementioned axle. For example, in one exemplary embodiment, the wheel hub may include a hub casing, which may be positioned in circumspect relationship to the axle shaft when in use. The hub casing may include means for permitting the motorcycle rim to freely rotate when the motorcycle is in motion, which, in turn permits the motorcycle to be moved such as when the motorcycle is beng ridden. The hub casing may be of sufficient width and diameter to accommodate a spinning rim assembly in accordance with the present invention. The wheel hub and spinning rim assembly may be of sufficient width to permit the assembly to fit rotatably between the wheel face and at least one tong of the motorcycle fork. Preferably, the spinner assembly may be rotatably positioned between the wheel face and the wheel hub. The spinning rim assembly may be coaxially rotatably positioned relative to the motorcycle rim hub or shaft axle but not immovably affixed thereto. That is, the spinning rim assembly may be positioned such that it is free to rotate about the axle shaft, and about the wheel hub. Such free rotation may be accomplished through any conventional means for permitting an outer cylindrical component to be positioned about an inner cylindrical component and for permitting the outer component to freely rotate irrespective of the rotation of the inner component. For example, the frictional forces between the spinner assembly and the axle shaft may be reduced or eliminated, permitting the assembly to freely rotate, using, a bearing arrangement, friction-reducing composites, or the like.

Conventional methods of affixing a motorcycle wheel including a motorcycle hub to a motorcycle frame using an axle shaft are well known, and will not be discussed herein for brevity. Suffice it to say, in the embodiments described below, the motorcycle wheel is fixed to the motorcycle frame, via an axle shaft traversing coaxially through the motorcycle wheel and/or wheel hub so that the motorcycle wheel may rotate freely.

Further, a tire may be positioned on an outer perimeter of the motorcycle rim in any conventional manner. In that regard, the tire is not an essential element of the invention.

In one exemplary embodiment, the motorcycle rim may include an outer perimeter, which may be positioned in proximity of the spinning rim outer perimeter described below, but not affixed thereto. The motorcycle rim outer perimeter may include an outwardly disposed lip adjacent to the spinning rim outer perimeter. The outwardly disposed lip may be configured to ensure minimal friction between the motorcycle rim and spinning rim. For example, minimal friction between the outwardly disposed lip and the spinner rim outer perimeter may be achieved by providing a space of free air between the lip and the spinner rim to ensure no abutment between the components. Where there is an abutment, in one exemplary embodiment, the friction-reducing means may be, for example, a bearing arrangement, a friction-reducing composition, or the like.

In another exemplary embodiment where the motorcycle rim face includes spokes, the spinning rim may be provided alongside the spokes of the motorcycle rim face while permitting the spinning rim to rotate independently of the rotation of the motorcycle rim spokes. In one exemplary embodiment, the motorcycle rim spokes may extend radially from the motorcycle wheel hub, or from the rim axis of rotation to a portion of the motorcycle rim lip. Further still, the motorcycle spokes may be affixed to the motorcycle rim outer perimeter and may be additionally affixed near the motorcycle central axis of rotation, such that the spinning rim is positioned in between the motorcycle frame and the motorcycle spokes. In this way, the motorcycle wheel may appear to have internal moving parts since the motorcycle rim spokes may be positioned such that the spokes of the spinning rim move alongside the motorcycle rim spokes.

In another exemplary embodiment, the invention includes a first and second spinning rim which may be positioned on either side of the motorcycle rim, or both. Constructed in this manner, the first side spinning rim and the second spinning rim may rotate independently of the motorcycle rim and independently of each other. The first and second side of the spinning rim may be described herein in identical fashion. As such, the spinning rim assembly may be described with respect to only one side of the motorcycle rim, although both sides are contemplated herein. The present invention eliminates the use of the spinner mount, for attaching the spinner near the wheel face as described below. This is true, since the spinner of the present invention rotates around, and is supported by at least one of an axle shaft or wheel hub, disposed substantially through the spinner central axis of rotation. That is, the rotation of the spinning rim assembly may be promoted by the positioning of the axle shaft, eliminating the need for a conventional spinner mount.

Further, the spinning rim assembly of the present invention is of sufficient width to be included circumspect to the wheel axle shaft between the wheel and the vehicle frame. As such, the present invention excludes the use of a spinner mount as found in the prior art, (see e.g., Fowlkes patent above). As noted, in accordance with the prior art, the spinner mount is used to affix the spinner to a vehicle wheel face.

In accordance with yet another embodiment, the hub casing may be configured with a component for controlling the direction of rotation of the spinning rim. The components may be any device for controlling the angular movement of the rim, and may include, for example, a momentum controlling gear arrangement. Further still, the momentum controlling gear arrangement may be attached to the motorcycle frame and/or motorcycle wheel.

In yet another exemplary embodiment, the spinning rim may include adjustable removable angular weights disposed therethrough for adjusting the angular momentum of the spinning rim. The invention provides for adjusting the position or size of the weights to vary the rotational speed of the spinning rim. For example, where it is desired to increase the spinning angular speed, angular weights (or larger angular weights), may be affixed close to the spinning rim outer perimeter. By placing the weights closer to the spinning rim center, the angular rotation of the spinning rim may be slowed.

In still yet another exemplary embodiment, the spinning rim assembly of the present invention may include a harmonic damping mechanism for ensuring substantially smooth rattle-free rotation of the spinning rim.

BRIEF DESCRIPTION OF THE DRAWINGS

A more complete understanding of the present description may be derived by referring to the various exemplary embodiments which are described in conjunction with the appended drawing figures in which like numerals denote like elements, and in which.

DETAILED DESCRIPTION

The present invention may be described herein in terms of functional components. It should be appreciated that such functional components may be realized by any number of hardware components configured to perform the specified functions. For example, the present invention may employ various friction-reducing components, e.g., ball bearing casings, spherical or cylindrical bearings, pneumatically sealed friction-reducing gel casings and the like, which may permit a first wheel component to rotate in proximity to a second wheel component, with little restriction of movement.

It should be appreciated that the particular implementations shown and described herein are merely exemplary and are not otherwise intended to limit the scope of the present invention. Indeed, for the sake of brevity, conventional friction-reducing principles and components for enabling motorcycle motion will not be discussed herein. Furthermore, the connecting lines shown in the various figures contained herein are intended to represent exemplary functional relationships and/or physical couplings between the various elements. Further still, it should be noted that many alternative or additional functional relationships or physical connections may be present in a practical motorcycle rim, motorcycle rim attachment, motorcycle wheel hub, and/or motorcycle axle shaft.

To further explain in more detail various aspects of the present invention, exemplary embodiments of the spinning rim disclosed herein will be provided. However, it should be noted that the following exemplary embodiments are for illustrative purposes, and that the present invention may comprise various other configurations consistent with the present description. Indeed, it is to be appreciated that the present invention may be practiced with any variation on the size and/or shape of the motorcycle wheel, wheel spokes and tires.

Figure 1:
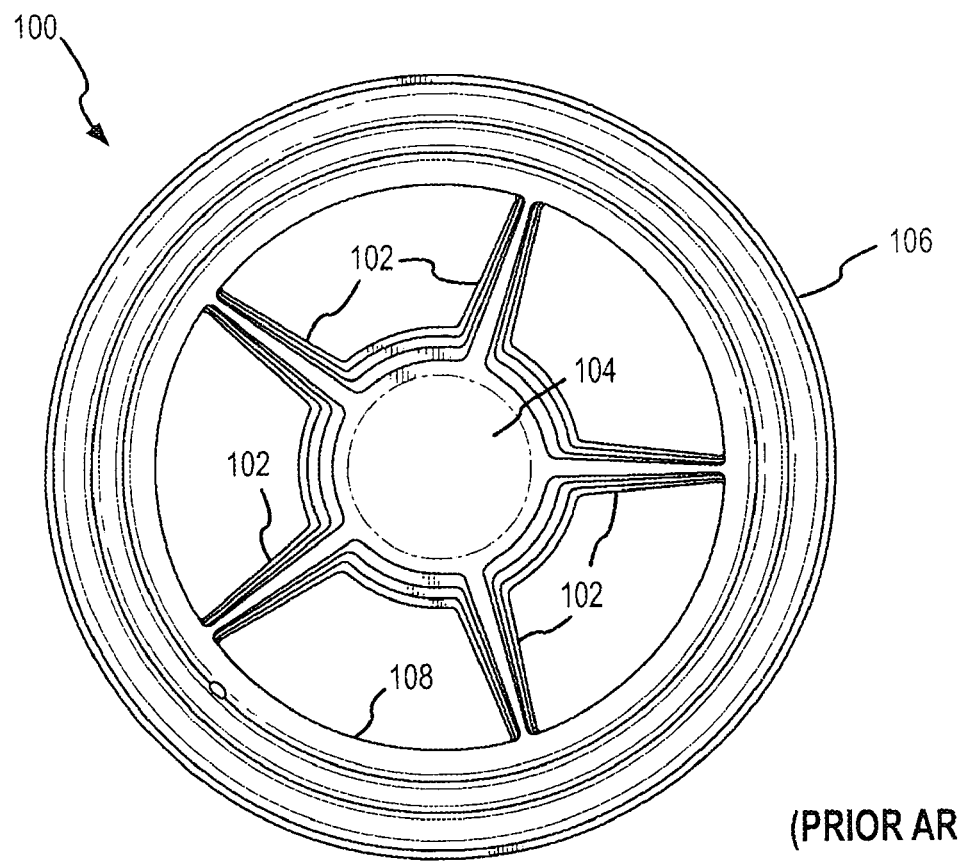
FIG. 1 illustrates an exemplary prior art design of a motorcycle wheel face.
Figure 2:
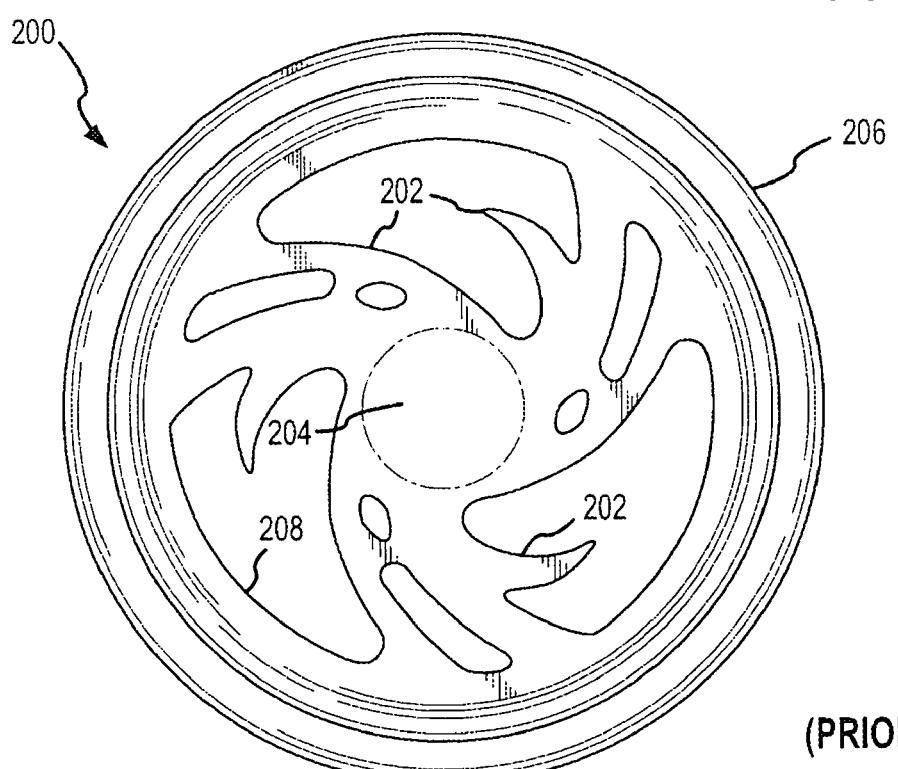
FIG. 2 illustrates another exemplary prior art of a motorcycle wheel face.
Figure 3:
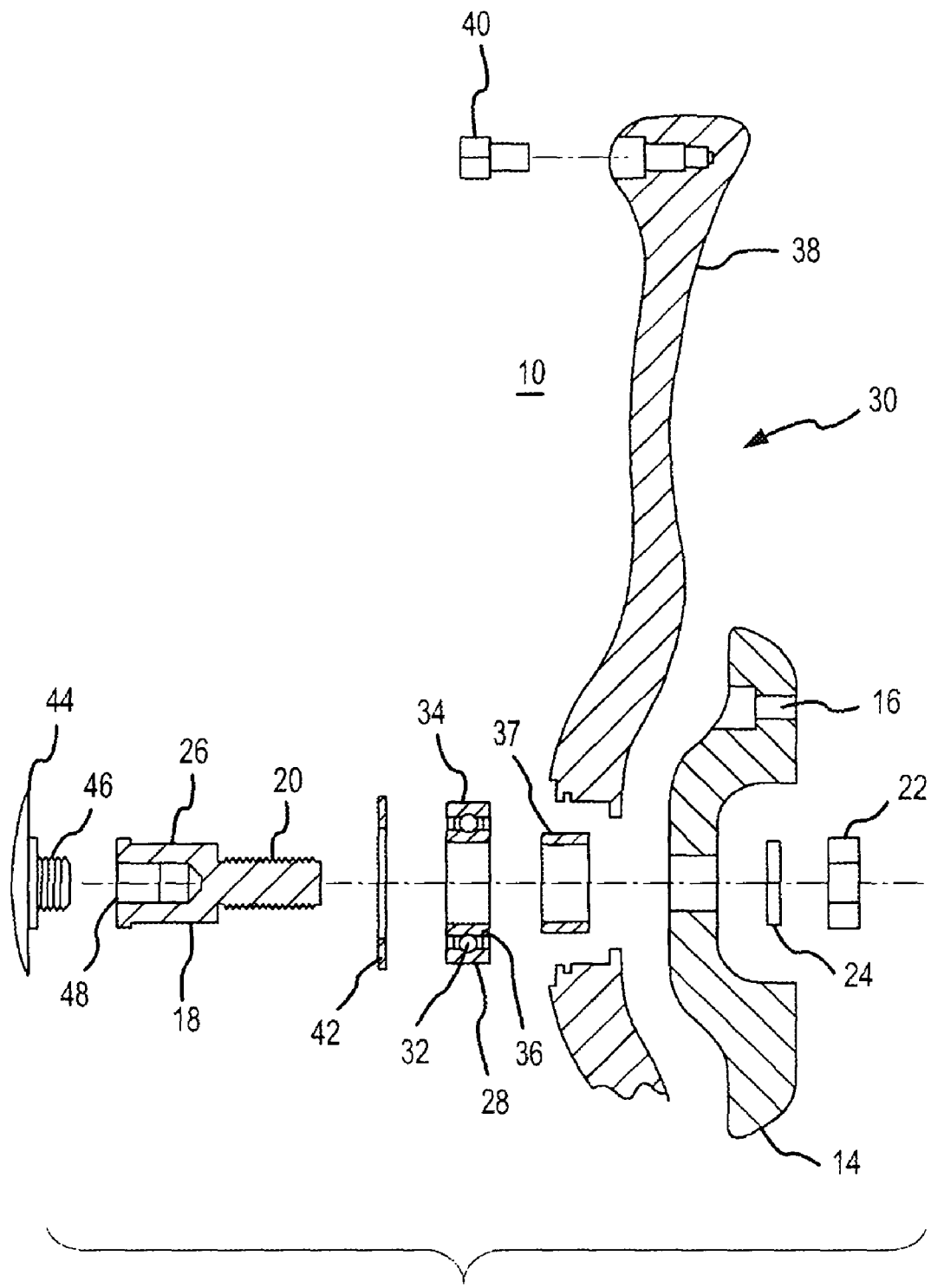
FIG. 3 illustrates another exemplary prior art of a motorcycle wheel face.
Figure 4:
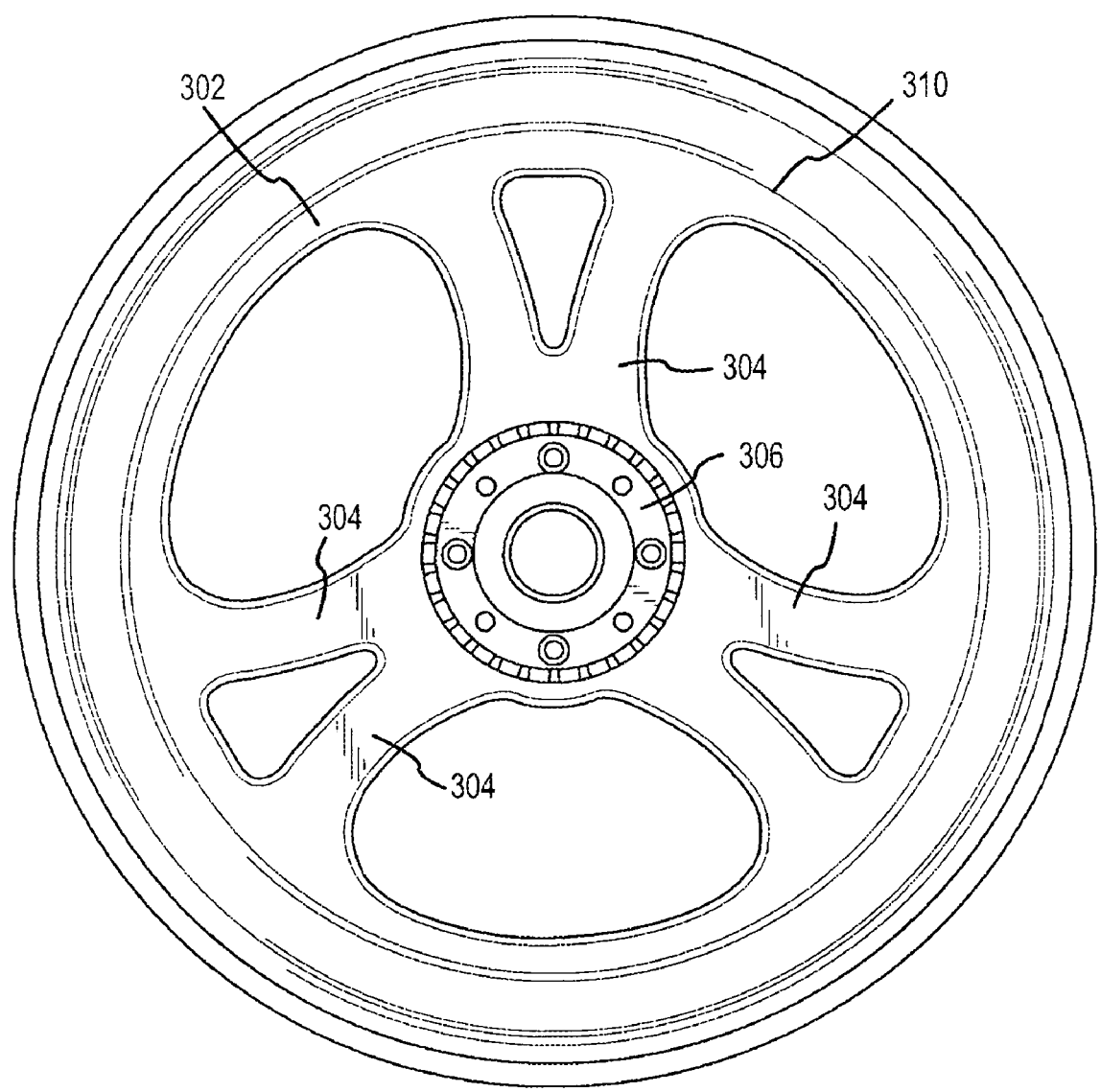
FIG. 4 illustrates an exploded view of an exemplary embodiment of a motorcycle rim structure in accordance with the present invention.
Figure 6A:
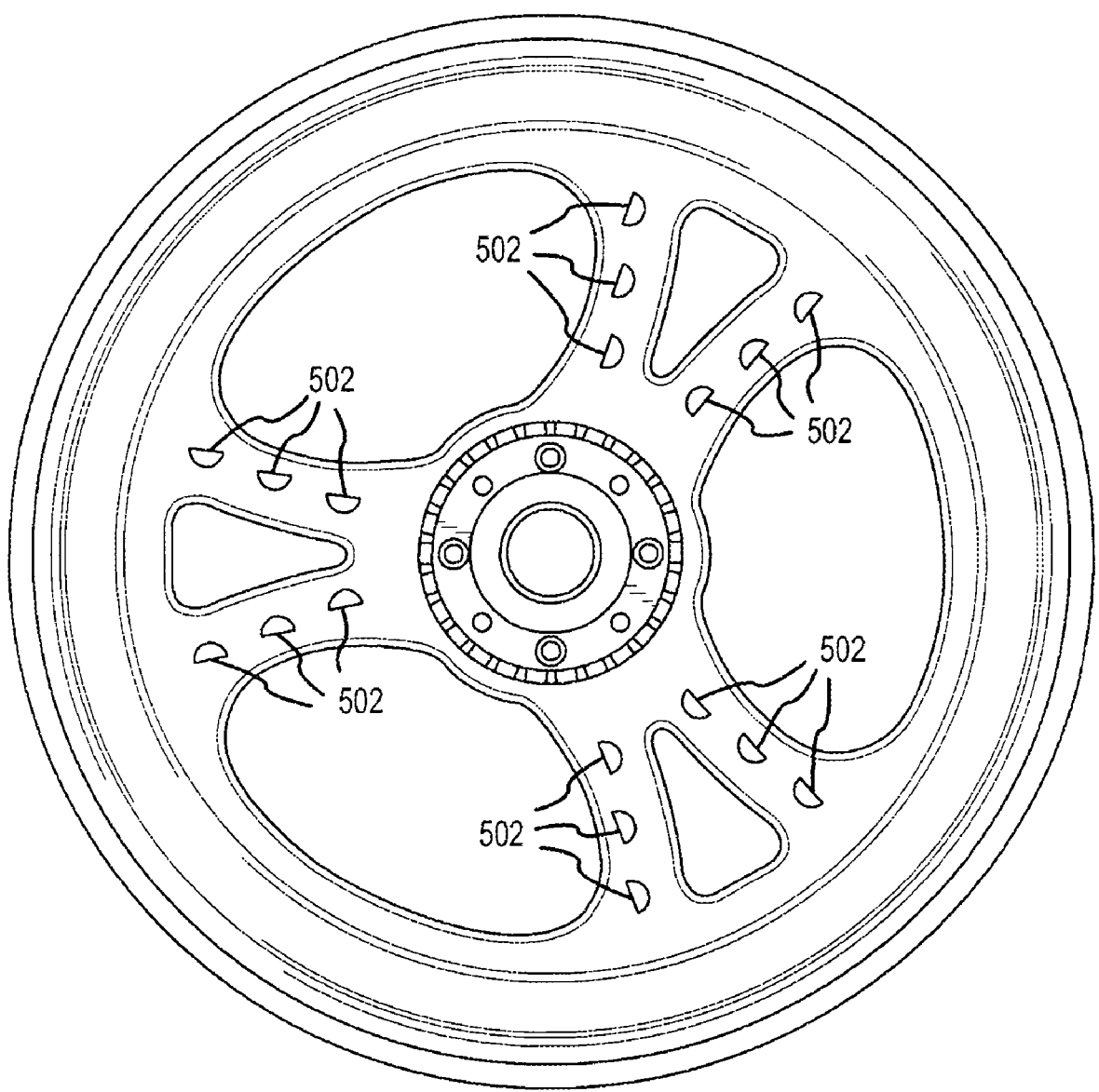
FIG. 6A depicts an exemplary embodiment of a motorcycle rim structure in accordance with the present invention, including radially positioned friction increasing pockets.
Figure 6B:
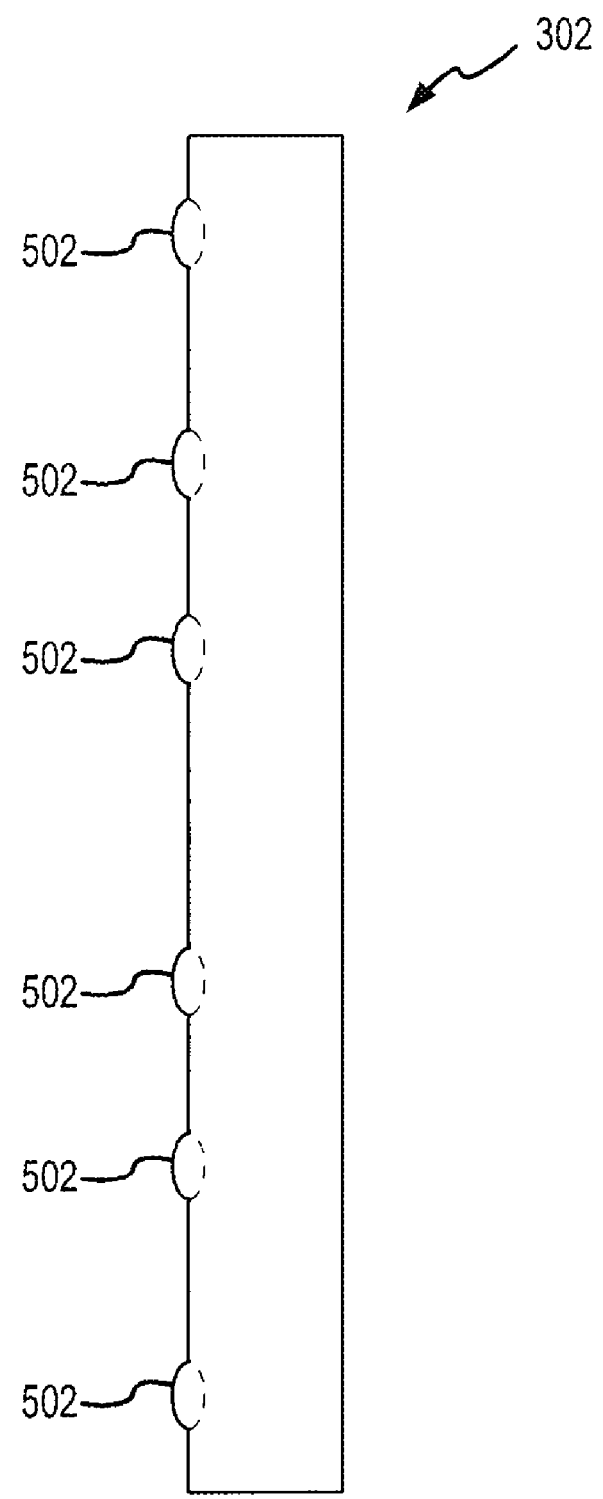
FIG. 6B depicts a side view of an exemplary embodiment of a motorcycle rim structure in accordance with the present invention, including radially positioned friction increasing pockets.

With reference to FIG. 4, an exemplary embodiment of a spinning rim assembly 300 in accordance with the present invention is shown attached to a motorcycle rim (shown on FIG. 6). Spinning rim assembly 300 may include a spinning rim 302 including substantially planar spokes 304. Spinning rim spokes 304 may be radially attached between the spinning rim outer perimeter 310 and the a motorcycle hub 306 or, alternatively, spokes 304 may be radially attached to a spinning rim circular cavity or bore positioned coaxially and coextensively with the motorcycle hub 306, as detailed below. The hub 306 is adopted to receive and support a motorcycle wheel axle shaft. The hub 306 additionally may support retaining means, and a friction-reducing means best seen in FIG. 4. The spokes of the spinning rim 302 may be attached to the outer perimeter 310 using any conventional method found in the art for attaching motorcycle spokes. For example, the spinning rim 302 and spokes 304 may be formed of a single molded metal of sufficient strength to ensure that the shape of the rim is maintained during motorcycle operation. The spokes 304 may additionally be formed integral to the spinning rim 302, or configured for removal or adjustment for easy replacement or repair.

It should be noted that the spinning rim assembly 300 is attachable on either side of the motorcycle rim 320. Thus, unless specifically indicated herein, the description of the spinning rim assembly 300 is applicable irrespective of the side of the motorcycle rim on which the spinning rim assembly 300 is affixed. Indeed, it is most preferable that the spinning rim assembly 300 be affixed to both sides of the motorcycle rim, for optimal viewing experience.

Figure 5A:
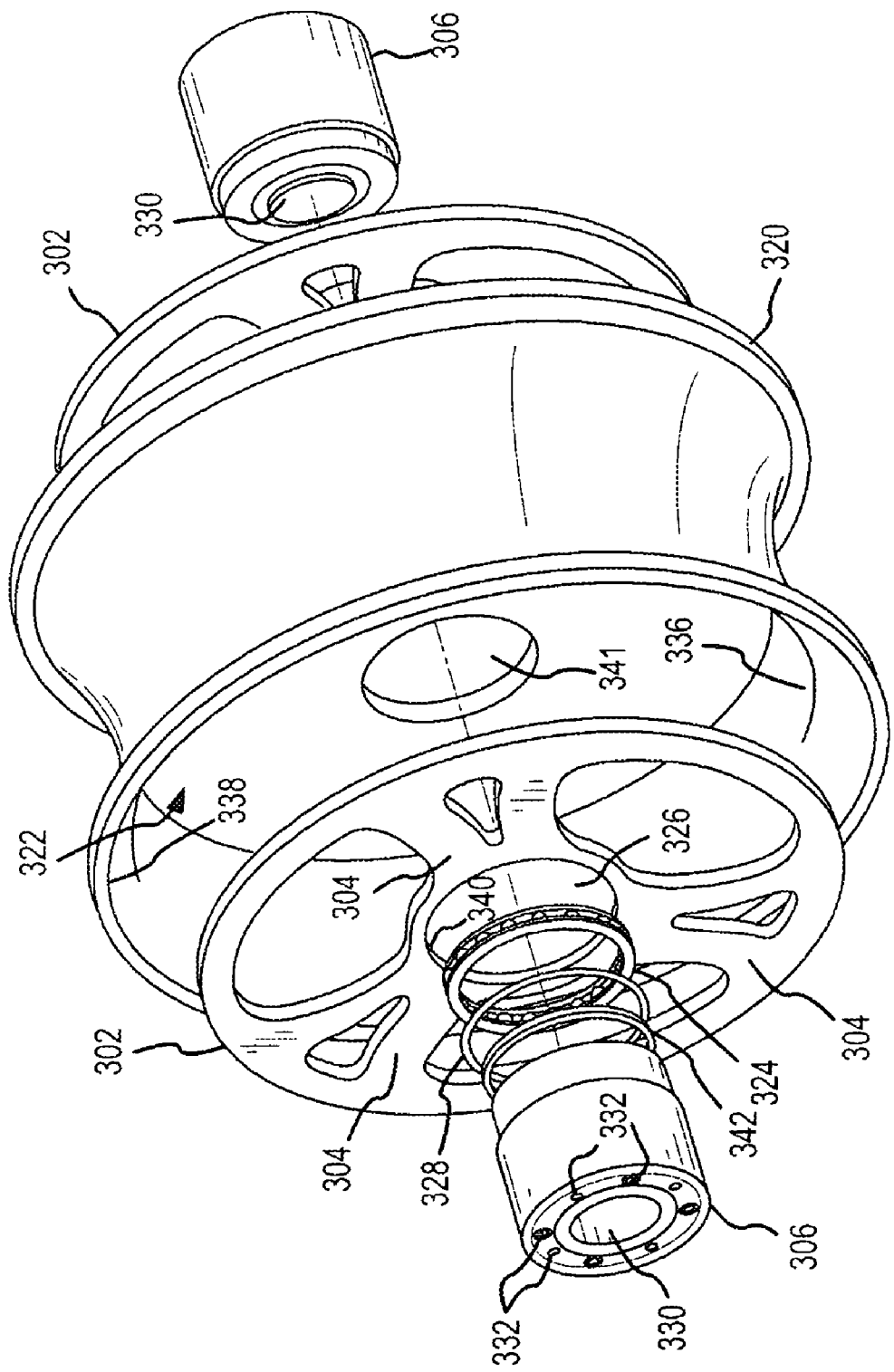
FIG. 5A depicts an exploded view of an exemplary embodiment of a motorcycle rim structure in accordance with the present invention.
Figure 5B:
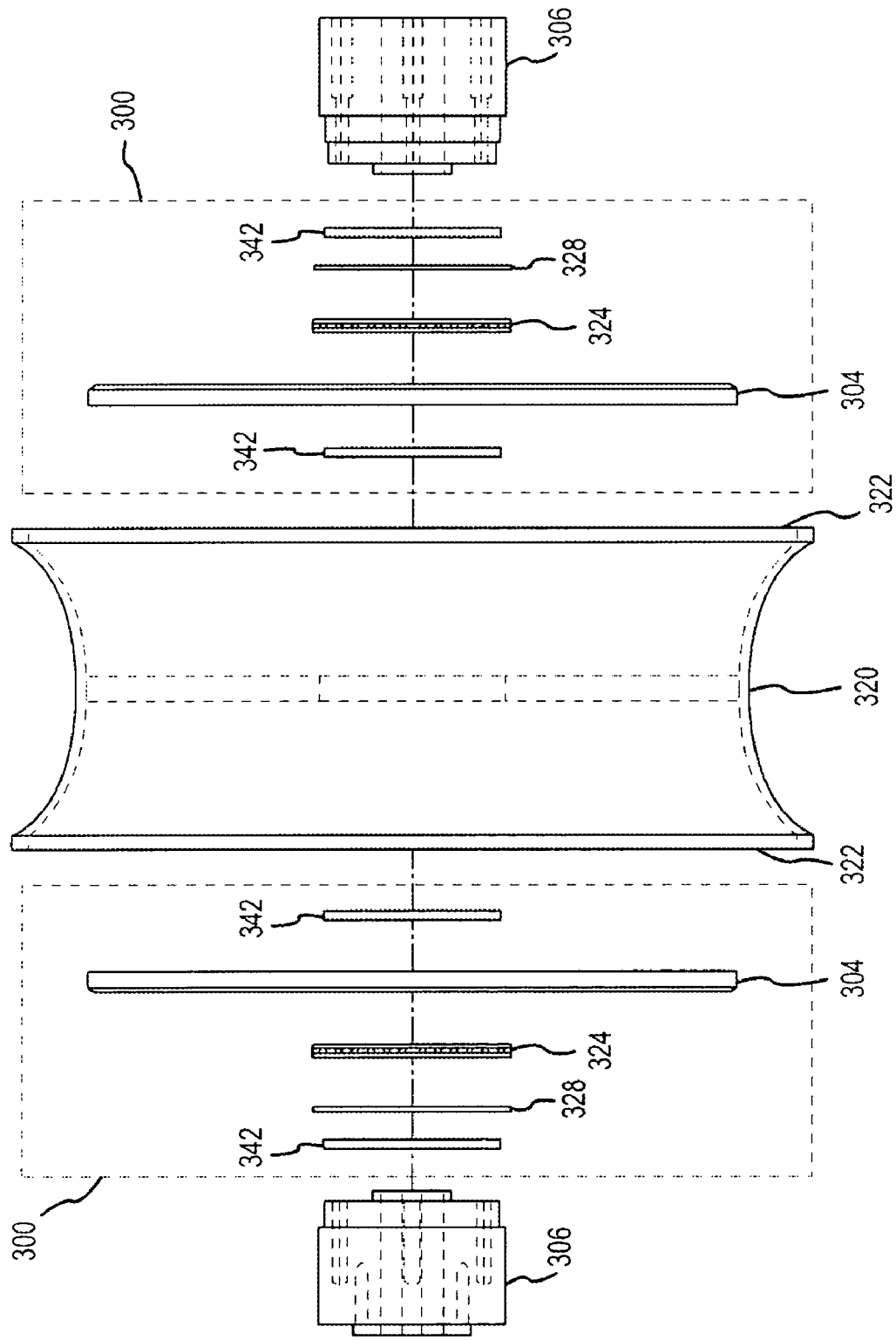
FIG. 5B depicts a side facing exploded view of an exemplary embodiment of a motorcycle rim structure in accordance with the present invention.

Further, it should be noted that the motorcycle rim 320 may not include spokes, but instead the motorcycle rim front face may be substantially planar. FIGS. 5A and 5B depict an exploded perceptive view of an exemplary spinning rim assembly 300 and a motorcycle rim 320 in accordance with the present invention, wherein the motorcycle rim front face 322 is substantially planar. In this arrangement, the flat planar front face 322 may be disc shaped, and may be seen as a surface underlying spinning rim spokes 304. That is, the front face 322 may be seen through the spinning spokes 304 during operation, as the spokes 304 rotate and/or when the spinning rim assembly 300 is at rest. In that regard, the front face 322 may include components which may be viewed by an outside observer. For example, the front face 322 may include a logo, a reflective surface, trademark, service mark, picture, or the like, or may include indentations, marking, engraving, reflective compositions or components, painting or other means for providing a more visually stimulating spinning rim experience. Typical spinning rims for use with the present invention wherein the wheel front face 322 and spinning rim spokes 304 are variously shown as spokes and a flat surface are disclosed in U.S. Design Patent Application No. 29/182,025, filed May 19, 2003, U.S. Design Patent Application No. 29/182,026, filed May 15, 2003, and U.S. Design Patent Application No. 29/182,024, filed May 15, 2003. Each of the above-noted design patent applications share common inventorship with the present invention, and are incorporated herein by reference.

As noted, in accordance with the present invention, the spinning rim assembly 300 may be positioned in proximity to, but not in substantial contact with, the motorcycle rim 320 such that free rotation of the spinning rim 302 may be achieved when the motorcycle is at a standstill. For example, spinning rim assembly 300 may include a cylindrical bushing 308 with a central bore for insertion of the axle shaft therethrough, which may be positioned in between the spinning rim 302 and front face 322, in a co-extensive coaxial relation. In one preferred embodiment, the bushing 308 may be of substantially similar circumference as the friction-reducing means, to support the friction-reducing means while prohibiting the friction-reducing means and the spinning rim 302 from abutting against front face 322 permitting spinning rim 302 to rotate. The spinning rim 302 may rotate in a clockwise or counterclockwise direction independent of the rotation of the motorcycle rim 320. Where the invention is incorporated into the front and rear wheel of a motorcycle the spinning rim of the front wheel may rotate in a different direction than the spinning rim of the rear wheel, or the spinning rims may rotate in the same direction.

The rotation of the spinning rim 302 may be aided by the shape or positioning of the spinning rim spokes 304 or the spinning rim disc. That is, the spokes or disc may be contoured such that at least one portion of the spinning rim 302 responds to friction caused by passing air. The spokes 304 or spinning disc may include, for example, pockets 502 (shown in FIGS. 6A and 6B) or outshoots designed to capture passing air during motorcycle operation to aid in facilitating spinning rim 302 rotation. As such, the shape of the spinning rim spokes 304 may be chosen to facilitate a desired angular rotation of the spinning rim 302 or other desired visual effect.

Referring against to FIG. 5, spinning rim assembly 300 may include a spinning rim 302 in physical communication with and supported by a friction-reducing means 324, positioned coaxially with a spinning rim bore 326. The friction-reducing means 324 may be held into position by a retaining means 328, and/or by a motorcycle hub 306. Hub 306 may further include a hub bore 330 for insertion of a conventional motorcycle wheel axle shaft.

Spinning rim assembly 300 is shown adjacent to a motorcycle rim 320, including a flat front face 322, and a wheel wall 336 positioned around the circumference of the front face 322. The wall 336 may be substantially perpendicular to the front face 322, such that the wall 336 and front face 322 may form a circular recess 340.

Front face 322 further may include a central bore 341, for passing an axle shaft (not shown) therethrough. The central bore 341 may be any conventional diameter for accepting either an individual single piece axle shaft, or an axle shaft hub combination, as are known in the art. As such, the central bore 341 may be of any suitable dimensions for use in attaching a motorcycle wheel to an axle and additionally securing the axle to a motorcycle frame, as is known in the art.

Spinning rim assembly 300 may further include a spinning rim 302, rotatably positioned in adjacent relationship with front face 322. As noted, the spinning rim 302 may be disc shaped, and may include spokes 304, or spinning rim 302 may be formed of a disc structure including no spokes. In one exemplary embodiment, spinning rim 302 circumference may be chosen to be smaller than the circumference of the front face 322. Alternatively, the spinning rim 302 circumference may be slightly larger or substantially similar to front face 322. Preferably, the circumference of spinning rim 302 may be chosen to permit the spinning rim 302 to be rotatably positioned adjacent to the front face 322 inside wall 336 provided by the wheel 320 outwardly extending lip 338 positioned substantially at the face 322 perimeter.

Spinning rim 302 may further include a recess 340 formed coaxially with the spinning rim central bore 326. Recess 340 may be suitably shaped to receive a means for reducing friction 324 positioned between the spinning rim 302 and a portion of the hub 306 or the axle shaft. The friction-reducing means 324 may be any conventional means for reducing friction between adjacent mechanical parts. For example, the friction-reducing means may be any conventional bearing, ball bearing, cylindrical bearing case or the like, as is commonly known. The friction-reducing means 324 may be sealed against the interference of dust and dirt, and may include lubrication for preserving, for example, the rotation bearings and minimizing any friction experienced by the bearing structure.

The friction-reducing means 324, may be held into place by a retaining means 328 or hub 306. The retaining means 328 may be, for example, any conventional c-ring retainer, o-ring retainer, circular clip or the like which is suitable for ensuring continuous abutment of the spinning rim 302 and the friction-reducing means 324. In that regard, spinning rim 302 may include a groove 340 formed circumspect to the spinning rim bore 326 for securely accepting retaining means 328. Alternatively, no groove may be present, and the friction-reducing means may be inserted in spinning rim bore 326 to abut against a bushing 308, or face 322.

A hub 306 may be positioned in substantial abutment with and may support retaining means 328. Hub 306 may include any suitable shape which permits the retaining means 328 to support the spinning rim 302 and/or the friction reducing means 324, as described herein. Hub 306 defines an axis of rotation for the spinning rim 302 and motorcycle rim 320. As noted, hub 306 typically includes a hub bore 330 for insertion of a wheel axle shaft for affixing the spinning rim assembly 300 and motorcycle rim 320 to a motorcycle frame in any conventional manner. Hub 306 may further include a plurality of threaded bore holes 332 for use in attaching, for example, a conventional motorcycle brake system (not shown). In some instances, where a conventional "inside-out" brake assembly is used, a ring shaped rotor may be mounted to the wall 336. Such embodiments may not require hub bore holes 332 to be included.

It should be noted that the present invention is contemplated for use with wheels having an axle shaft through the wheels centered for attachment to the vehicle frame, preferably on both sides of the wheel. The axle shaft, which may include conventional construction and may be a multiple pieces shaft, is attachable to vehicle frame on both sides of the axle shaft to permit the rotation of the wheel 320 to be observed on either side by a casual outside observer. As such, the spinner assembly 300 may be mountable on either side of the wheel 320 during operation. Thus, the axle shaft may also be of sufficient length to affix a spinner assembly 300 to both sides of the wheel 320. Particularly, the axle shaft may extend between the first side hub 306 and the second side hub 306 within bore hole 330, which defines a bore suitable for receipt of the shaft. As such, although the present description details the use of a spinner assembly 300 respecting one side of the wheel 320, the description applies substantially equally to the other side of the wheel 320, unless specifically noted.

For example, the rear wheel of a motorcycle may include a first side hub of similar general construction as hub 306, but the first side hub may also be adapted to support a drive sprocket (not shown). The drive sprocket may be attachable to hub holes 332 in any conventional manner. The drive sprocket may be driven by a link chain in communication with a drive train, or the like, for controlling the forward motion of the motorcycle. As such, the spinning rim assembly 300 may be rotatably affixed to the rear wheel in between the drive sprocket and the rear wheel. Preferably, the spinning rim assembly 300 is rotatably positioned in between a rear wheel hub 306 and the rear wheel 320 in similar manner as discussed above.

Figure 7:
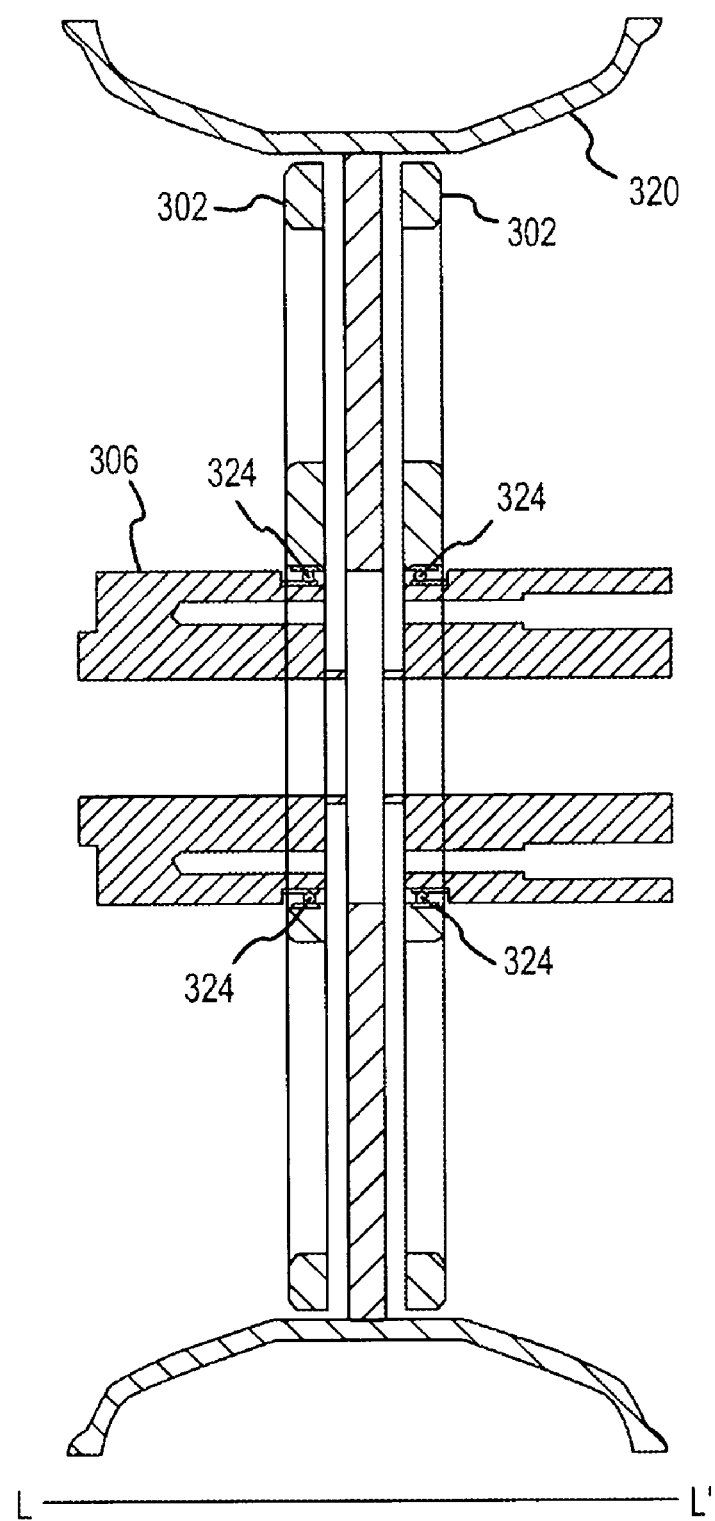
FIG. 7 illustrates a cross-sectional view of an exemplary embodiment of a motorcycle rim system in accordance with the present invention.

FIG. 7 is cross-sectional view of an exemplary embodiment of the spinning rim assembly 300 shown attached to wheel 320. As can be seen, spinning rim 302 may be supported by friction-reducing means 324 (shown as cross-section of ball-bearing arrangement) and by retaining means 328, which is further supported by hub 306. Since the lateral distance (from L to L) between hubs 306 often varies among motorcycle manufacturers, a spacer 342 (shown also in FIG. 5B) may be included coaxially to the motorcycle at the shaft, for example, between hub 306 and retaining means 328, between friction-reducing means 324 and front face 322, between hub 306 and the motorcycle frame (not shown), and/or between spinning rim 302 and front face 322. The spacer may be such that it supports the friction-reducing means 324 or spinning rim 302 in a non-abutment with wheel front face 322. Such spacers 342 are well known in the art, and, as such, a description of the spacers will not be included for brevity.

Figure 8A:
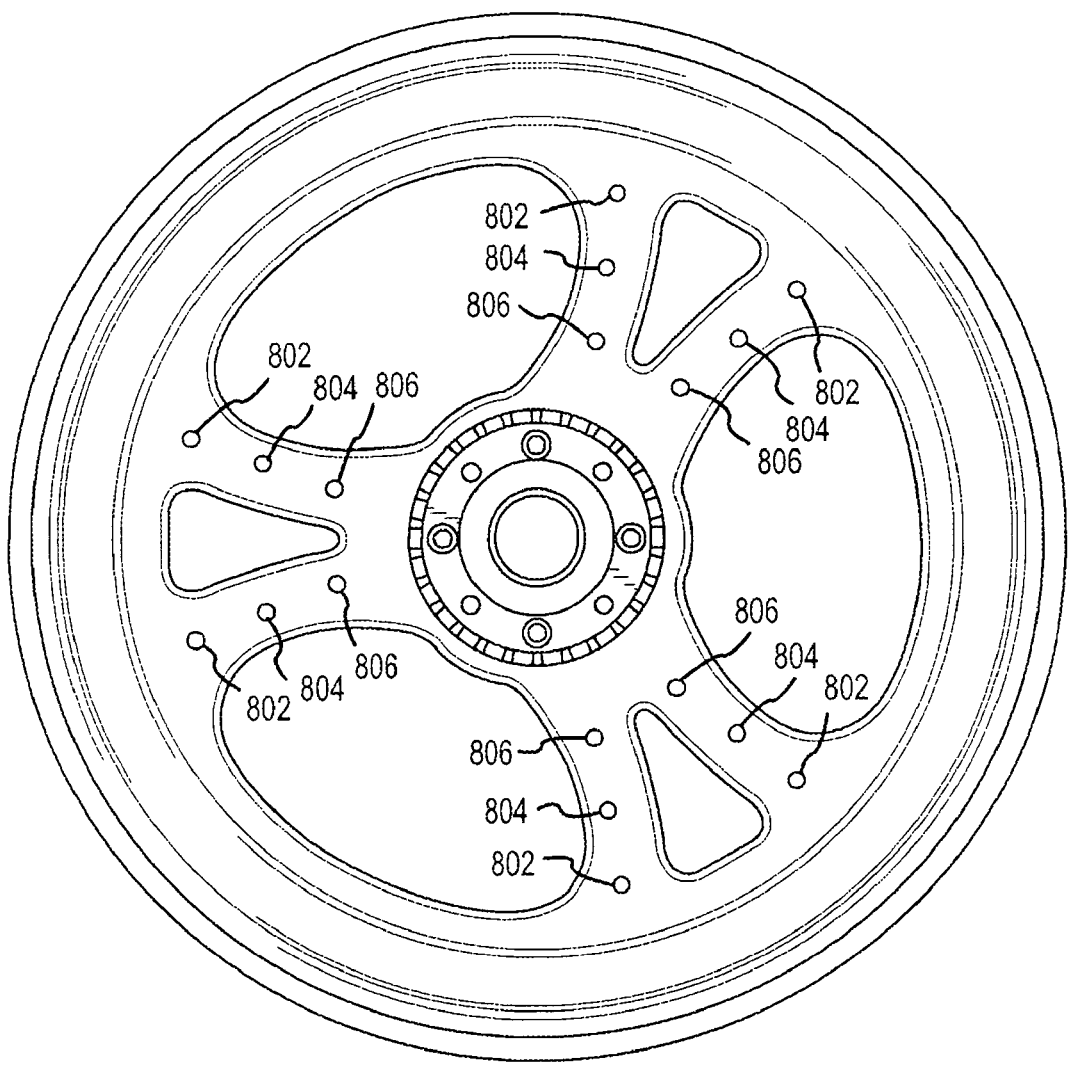
FIG. 8A depicts an exemplary embodiment of a motorcycle rim structure in accordance with the present invention, including radially positioned weight affixing locations.
Figure 8B:
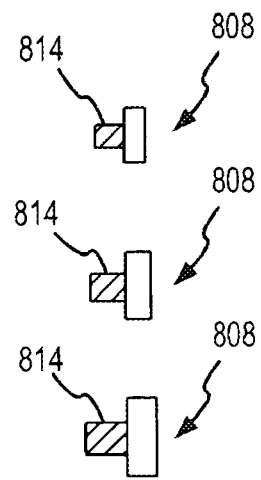
FIG. 8B depicts exemplary weights which may be used with the present invention.

FIGS. 8A and 8B show an exemplary spinning rim 302 including a plurality of radially positioned weight affixing locations 802, 804, 806, for positioning weights (808) of various sizes for affecting the angular momentum of the spinning rim 302. Weights 808 may be of any construction having mass which is attachable to spinning rim 302, and which does not substantially interfere with the free rotation of the spinning rim 302, for example, in between front tongs for attaching the wheel to a motorcycle frame. In one exemplary embodiment, locations 802, 804, 806 may be threaded bore hole and weights 808 may include a mating threaded portion 814 for "screwing" (i.e., attaching) the weights to a desired location 802, 804, 806 on the wheel.

The angular momentum or speed of the rim 302 may be adjusted by placing weights at the various affixing locations. For example, with weights 808 affixed at location 806, being disposed at the distal end of the spinning rim 302, the angular momentum of the spinning rim 302 may be increased. Alternatively, with the weights 808 affixed at location 804 or 806, the angular momentum may be decreased. As such, the weights 808 may be affixed to rim 302 at any desired location 802, 804, 806, for generating a desired spinning rim rotational speed. In addition, although depicted with three levels of weights affixing locations, the invention is not so limited. More or less levels of weight affixing locations may be employed as desired.

As noted, a key feature of the present invention is to provide for simulated rim rotation when the wheel is stationary. This feature is provided by permitting free rotation of the spinning rim 302 irrespective of the motorcycle rim's 320 motion. In that regard, hub 306 may further include and an internal rim hub casing (not shown) which may have a similar description as friction-reducing means 324 and which may be positioned inside and/or sealed inside hub 306 and in contact with the axle shaft 320. In this way, internal rim hub 330 may be permitted to freely rotate about axle 320 relatively free of angular friction of such hub.

During operation, a motorcycle tire (not shown) may be affixed to the outer perimeter 338 of the wheel 320 such that the tire may maintain contact with a road surface. As the motorcycle is ridden, the tire and wheel 320 combination rotates. The combination ceases rotation when the motorcycle is brought to a stop. Contrarily, the spinning rim 302 rotates independently of the rotation of the wheel 320 and tire combination. That is, the spinning rim 302 is permitted free rotation about the axle shaft due to the friction-reducing environment provided by the friction-reducing means 324. The free rotation of the spinning rim 302 is aided by, for example, a cylindrical bearing arrangement included in the groove 340 of spinner bore hole 326. Since little friction exists between the axle and the spinning rim 302, and between the spinning rim 302 outer perimeter and the motorcycle wheel 320 outwardly disposed lip 338, the spinning rim 302 may rotate clockwise (or counter clockwise) independent of the rotation of the motorcycle tire and wheel rim 320 combination. In this way, the spinning rim 302 may simulate wheel rotation irrespective of whether the motorcycle is in motion, or may simulate a different wheel angular speed than is actually present.

In some instances, the rotation of the wheel 320 and tire combination may experience substantial disruptive harmonic resonance due to the unevenness of the surface over which a motorcycle is ridden. The disruptive harmonics may be caused, for example, by a bump or "pot hole" in the surface, which may cause the wheel 320 to jolt unexpectedly. Such action may generate the disruptive harmonics and translate the disruptive harmonics as to the spinner assembly 300 causing the spinning rim 302 to rattle, or to rotate unevenly. As such, the spinner assembly may include means for dampening the disruptive harmonics, thereby permitting smooth continuous rotation of the spinning rim 302. For example, one suitable dampening means may include adding weight to the spinner 302 substantially near the spinning rim 302 axis of rotation, in proximity to the friction-reducing means 324. Weight may be added to the spinning rim 302 by, for example, providing screws, rivets or the like, to one side of the spinning rim 302. Alternatively, bushing 308 or spacer 342 may be formed of a shock absorbing composition, such as, for example, rubber or the like. Conventional means for dampening disruptive harmonics in mechanical devices, which are suitable for the present invention, are well known and will not be discussed herein for brevity.

The present invention has been described above with reference to various exemplary embodiments. However, those skilled in the art will recognize that changes and modifications may be made to the exemplary embodiments without departing from the scope of the present invention. For example, the various friction-reducing means as are known in the art may be employed in place of the bearings described herein. Further, the present invention is operable irrespective of the shape and contour of the spokes. That is, the spokes may be blades, plates or rods, discs, or the like, as are commonly found in the motorcycle wheel art. Further still, the invention may include various components located within the wheel rim hub which may facilitate free rotation of the internal rim in clockwise or counterclockwise rotation. Such a component may be configured to control the angular momentum of the internal rim. The spokes may include various configurations and contours relative to the desired rotation of the internal rim. In addition, any number of cost considerations may affect the material or arrangement of the system described herein. Even further, it should be noted that while the free spinning rim arrangement described above is disclosed with respect to a motorcycle, it should be understood that the wheel is suitable for any vehicle wherein the simulated wheel rotation is visible from either side of the wheel construction. Yet further, the present invention may be modified such that the rotation of the internal rim is viewed from only one side of the motorcycle wheel. For example, the present invention may be configured such that one side including the spinning rim assembly is in free rotation and the remaining side including the spinning rim assembly is fixed immovably to the motorcycle rim. The changes and/or modifications described above are intended to be included within the scope of the present disclosure.

The invention claimed is:

1. A wheel spinner assembly mountable to a first wheel face and second wheel face of a wheel of a vehicle, the assembly comprising:
   a. a first spinner rotatably mountable to said wheel in proximity to said first wheel face, said first spinner including a first spinner central bore through which at least one of a wheel axle shaft and a first side wheel hub is insertable during mounting to said wheel, wherein said first spinner rotates around at least one said wheel axle shaft and first side wheel hub when said wheel rotates and wherein said first spinner substantially continues to rotate when said wheel ceases rotation, wherein said first spinner includes radially disposed pockets responsive to the friction of passing air, for increasing the angular momentum of inertia of said first spinner;
   b. a second spinner rotatably mountable to said wheel in proximity to said second wheel face, said second spinner including a second spinner central bore through which at least one of said wheel axle shaft and a second side wheel hub is insertable during mounting to said wheel, wherein said second spinner rotates around at least one said wheel axle shaft and second side wheel hub when said wheel rotates and wherein said second spinner substantially continues to rotate when said wheel ceases rotation; and
   c. a friction reducing means in physical communication with said first spinner central bore, said friction reducing means configured to be coaxially positioned between the first spinner and at least one of said wheel axle shaft and first side wheel hub, said friction reducing means supporting said first spinner.

2. A wheel spinner assembly in accordance with claim 1, further comprising: a retaining means in physical communication with said friction reducing means to ensure abutment of said friction reducing means with said first spinner central bore, said retaining means configured to be coaxially positioned around at least one of said wheel axle shaft and first side wheel hub.

3. A wheel spinner assembly in accordance with claim 2, further including a spacer including a spacer central bore, said spacer configured to be coaxially positioned around at least one of said wheel axle shaft and first side wheel hub, said spacer in physical communication with at least one of said friction reducing means and said retaining means.

4. A wheel spinner assembly in accordance with claim 3, wherein said first side wheel hub includes a first side wheel hub central bore, said first side wheel hub central bore configured to be coaxially positioned around said wheel axle shaft, said first side wheel hub in physical communication with at least one of said spacer, said friction reducing means, and said retaining means.

5. A wheel spinner assembly in accordance with claim 1, wherein said first spinner is configured with a greater spinner mass in proximity to the first spinner outer perimeter than near the first spinner axis of rotation, for increasing the angular momentum of inertia of said first spinner.

6. A wheel spinner assembly in accordance with claim 1, wherein said first spinner is formed with a contoured outer surface responsive to the friction of passing air, for increasing the angular momentum of inertia of said first spinner.

7. A wheel spinner assembly in accordance with claim 1, wherein said first spinner is constructed to ensure increased angular momentum during operation.

8. A wheel spinner assembly in accordance with claim 1, further including a bushing for ensuring non-abutment of said first spinner with said first wheel face during mounting of said first spinner.

9. The wheel spinner assembly of claim 1, wherein the vehicle is a motorcycle.

10. A wheel spinner assembly mountable to a first wheel face and second wheel face of a wheel of a vehicle, the assembly comprising:
   a. first and second spinners rotatably mountable to said wheel, said first spinner rotatably mountable in proximity to said first wheel face and said second spinner mountable in proximity to said second wheel face, said first and second spinners including a spinner central bore through which at least one of a wheel axle shaft and wheel hub is insertable during mounting to said wheel; and
   b. first and second friction reducing means, said first friction reducing means in physical communication with said first spinner central bore, said second friction reducing means in physical communication with said second spinner central bore, said first and second friction reducing means configured to be coaxially positioned between at least one of said wheel axle shaft and wheel hub and the first or second spinner, respectively, said first friction reducing means supporting said first spinner, and said second friction reducing means supporting said second spinner, and wherein said spinner rotates around said at least one of said wheel axle shaft and wheel hub, when mounted; and wherein at least one of said first and second spinners includes radially disposed pockets responsive to the friction of passing air, for increasing the angular momentum of inertia of at least one of said first and second spinner.

11. A wheel spinner assembly in accordance with claim 10, further comprising: first and second retaining means, said first retaining means in physical communication with said first friction reducing means to ensure abutment of said first friction reducing means with said first spinner central bore, said second retaining means in physical communication with said second friction reducing means to ensure abutment of said second friction reducing means with said second spinner central bore, said first and second retaining means configured to be coaxially positioned between the first second spinner, respectively, and at least one of said wheel axle shaft and wheel hub.

12. A wheel spinner assembly in accordance with claim 10, further including a spacer including a spacer central bore, said spacer configured to be coaxially positioned between the first second spinner, respectively, and at least one of said wheel axle shaft and wheel hub, said spacer in physical communication with at least one of said first and second friction reducing means and said first and second retaining means.

13. A wheel spinner assembly in accordance with claim 10, wherein said wheel hub includes a first side wheel hub in proximity to said first wheel face, said first side wheel hub including a hub central bore, said first side wheel hub configured to be coaxially positioned between the first second spinner, respectively, to said wheel axle shaft, said first side wheel hub in physical communication with at least one of said spacer, said friction reducing means, and said retaining means.

14. A wheel spinner assembly in accordance with claim 10, wherein at least one of said first and second spinners is configured with a greater spinner mass in proximity to a first or second spinner outer perimeter than near the first or second spinner axis of rotation, for increasing the angular momentum of inertia of said first and or second spinner.

15. A wheel spinner assembly in accordance with claim 10, wherein the at least one of said first and second spinners is formed with a contoured outer surface responsive to the friction of passing air, for increasing the angular momentum of inertia of said at least one of said first and second spinner.

16. A wheel spinner assembly in accordance with claim 10, wherein the at least one of said first and second spinners is constructed to ensure increased angular momentum during operation.

17. A wheel spinner assembly in accordance with claim 10, further including at least one of a first and second bushings for ensuring non-abutment of at least one of said first and second spinner with a vehicle wheel face during mounting.

18. The wheel spinner assembly of claim 10, wherein the vehicle is a motorcycle.

19. A method for providing a free rotation spinner assembly mountable to a vehicle wheel, comprising:

a. providing a first spinner adjacent to, but not in physical contact with, a first wheel face of the vehicle wheel, the first spinner including a first spinner central bore through which at least one of a wheel axle shaft and a first side wheel hub is insertable during mounting and radially disposed pockets responsive to the friction of passing air, for increasing the angular momentum of inertia of said first spinner;

b. providing a second spinner adjacent to, but not in physical contact with, a second wheel face of the vehicle wheel, the second spinner including a second spinner central bore through which at least one of a wheel axle shaft and a second side wheel hub is insertable during mounting; and c. providing a friction reducing means in physical communication with said first spinner central bore, said friction reducing means configured to be coaxially positioned between the first spinner and at least one of said wheel axle shaft and said first side wheel hub, said friction reducing means supporting said first spinner for providing free rotation when said wheel rotates and substantially continuous rotation when said wheel ceases to rotate.

* * * * *